(12) United States Patent
Chen et al.

(10) Patent No.: US 12,276,753 B2
(45) Date of Patent: Apr. 15, 2025

(54) OPTICAL TRANSCEIVING MODULE AND LASER RADAR

(71) Applicant: Hesai Technology Co., Ltd., Shanghai (CN)

(72) Inventors: Jie Chen, Shanghai (CN); Shaoqing Xiang, Shanghai (CN)

(73) Assignee: HESAI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/759,024

(22) Filed: Jun. 28, 2024

(65) Prior Publication Data

US 2024/0361433 A1 Oct. 31, 2024

Related U.S. Application Data

(63) Continuation of application No. PCT/CN2022/103397, filed on Jul. 1, 2022.

(30) Foreign Application Priority Data

Dec. 30, 2021 (CN) .......................... 202111664881.3
Dec. 30, 2021 (CN) .......................... 202123435931.9

(51) Int. Cl.
  *G01C 3/08* (2006.01)
  *G01S 7/481* (2006.01)
  (Continued)

(52) U.S. Cl.
  CPC ............. *G01S 7/481* (2013.01); *G01S 7/4911* (2013.01); *G01S 7/4914* (2013.01)

(58) Field of Classification Search
  CPC ....... G01S 7/481; G01S 7/4911; G01S 7/4914
  See application file for complete search history.

(56) References Cited

U.S. PATENT DOCUMENTS 6,452,665 B1   9/2002  Kikuchi
2018/0341009 A1* 11/2018 Niclass ................. G01S 7/4817
  (Continued)

FOREIGN PATENT DOCUMENTS

CN   112596041 A   4/2021
CN   112639514 A   4/2021
  (Continued)

OTHER PUBLICATIONS

International Application No. PCT/CN2022/103397, International Search Report dated Sep. 15, 2022.
  (Continued)

*Primary Examiner* — Mark Hellner
(74) *Attorney, Agent, or Firm* — Chiesa Shahinian & Giantomasi PC

(57) ABSTRACT

A light transceiving module and a LiDAR are disclosed. The light transceiving module includes: a light emitter module emitting a detection beam and a light receiver module receiving an echo beam of the detection beam reflected by a target object. The receiving module converts the echo beam into an electrical signal. A field of view of the light emitter module overlaps vertically with that of the light receiver module. In a first direction, a size of the field of view of the light emitter module is larger than that of the light receiver module. In a second direction perpendicular to the first direction, a size of the field of view of the light emitter module is smaller than that of the light receiver module. Thus, the consistency and stability of the distance measurement capabilities of various channels can be ensured.

18 Claims, 14 Drawing Sheets

(51) Int. Cl.
*G01S 7/4911* (2020.01)
*G01S 7/4914* (2020.01)

(56) References Cited

U.S. PATENT DOCUMENTS

2020/0386876 A1 12/2020 Kudla et al.
2021/0033711 A1* 2/2021 Helsloot ............... G01S 7/4817

FOREIGN PATENT DOCUMENTS

| CN | 113640819 A | 11/2021 | |
|----|-------------|---------|---|
| CN | 216646803 U | 5/2022 | |
| WO | WO 2017110574 A1 * | 6/2017 | ........... G01S 7/4817 |

OTHER PUBLICATIONS

International Application No. PCT/CN2022/103397, Written Opinion dated Sep. 15, 2022.
Extended European Search Report mailed Jan. 28, 2025 in connection with European Patent Application No. 22913273.3, filed Jul. 1, 2022, 11 pgs.

* cited by examiner

OPTICAL TRANSCEIVING MODULE AND LASER RADAR

REFERENCE TO RELATED APPLICATION

The present application claims priority to PCT Application No. PCT/CN2022/103397 filed on Jul. 1, 2022, which claims priority to Chinese application Ser. No. 20/211, 1664881.3 filed on Dec. 30, 2021 and claims priority to Chinese Application No. 202123435931.9 filed on Dec. 30, 2021, the contents of which are herein incorporated by reference in their entirety.

TECHNICAL FIELD

Embodiments of this disclosure relate to the technical field of optical perception and, in particular, to a light emitter and receiver module and a LiDAR.

BACKGROUND

Based on the autonomous driving classification system currently used uniformly in the industry and formulated by the Society of Automotive Engineers International ("SAE International"), autonomous driving is divided into six levels in total: L0, L1, L2, L3, L4, and L5 based on degrees of automation from low to high, among which, L4 and L5 are ultra-high-speed autonomous driving and fully autonomous driving, respectively. They are two levels with the largest degrees of automation. Drivers do not need to deal with intense driving situations and can even sleep peacefully or leave their seats.

To achieve higher degrees of automation in autonomous driving, the autonomous driving industry needs high-performance LiDARs capable of automotive-grade mass production to serve as the primary sensor for L4 and higher levels. At present, a relatively mature technology is still a mechanical LiDAR which can only have 128 lines, with a vertical resolution close to 0.1° in some dense regions. To achieve a distance measurement capability of nearly 200 meters, this kind of LiDAR typically uses an edge emitting laser ("EEL") and an avalanche photo diode ("APD") as core components of the light emitter and receiver module. the production cost and efficiency of these components are very unfavorable for popularization and application.

A vertical cavity surface emitting laser ("VCSEL") and a silicone photomultiplier ("SiPM") gradually show obvious advantages over the light emitter and receiver module composed of the EEL and the APD. They facilitate the development of a LiDAR with a higher resolution, and their performance is gradually approaching or even surpassing than that of the latter, wherein the VCSEL emits light vertically. When the VCSEL is combined with the SiPM, symmetrical optical paths can be used, which has highly efficient light alignment and is very stable under various vibrations and temperatures. Moreover, the SiPM uses a low-voltage complementary metal-oxide-semiconductor ("CMOS") process, so the SiPM is very suitable for being integrated with a readout circuit. These make it possible to build a high definition 1 dimension ("HD1D") line array, paving the way for rapid production of low-cost and high-performance LiDARs.

However, a single photon avalanche diode ("SPAD") is difficult to be used in a high-performance LiDAR because once the SPAD is triggered, the device requires tens of nanoseconds to recover its response. When an echo signal is very strong, it is difficult for a single SPAD to accurately reflect the time of the echo signal during single detection. Time of flight ("ToF") information can be determined only after hundreds or thousands of pulses are counted. Therefore, multiple SPADs need to be combined into a SiPM array.

One benefit of using a combination of the VCSEL and the SiPM in the light emitter and receiver module of a LiDAR is that emitting and receiving circuit boards are both perpendicular to the optical axis. When an optical-mechanical structure slightly deforms due to temperature or stress, especially when a circuit board itself warps, it typically does not cause significant shifts in light alignment, that is, a correspondence relationship between emitting and receiving channels is basically stable. Such optical architecture makes it possible to achieve overall light alignment, greatly reducing the time needed for assembly and adjustment.

However, to ensure the consistency and stability of the distance measurement capabilities of various emitting and receiving channels, it is needed to further improve the light alignment accuracy of the light emitter and receiver module. How to improve the light alignment accuracy is a technical problem that needs to be solved by those skilled in the art.

The contents of the background section are only technologies known to the declarer and do not necessarily represent the prior art in this art.

SUMMARY

In view of this, the embodiments of this disclosure provide a light emitter and receiver module and a LiDAR, which can improve the light alignment accuracy, the consistency and stability of the distance measurement capabilities of various emitting and receiving channels can be ensured.

First of all, the embodiments of this disclosure provide a light emitter and receiver module, including: a light emitter module and a light receiver module,
  the light emitter module is configured to emit a detection beam;
  the light receiver module is configured to receive an echo beam of the detection beam reflected by a target object and convert the echo beam into an electrical signal, and a field of view of the light emitter module configured to overlap vertically with a field of view of the light receiver module, in a first direction, a size of the field of view of the light emitter module is larger than a size of the field of view of the light receiver module; in a second direction, a size of the field of view of the light emitter module is smaller than a size of the field of view of the light receiver module; and the first direction is perpendicular to the second direction.

Optionally, the light emitter module includes: multiple light emitter units; each light emitter unit includes multiple light emitter points; the multiple light emitter units share a common cathode or a common anode; and each light emitter unit has a connection point; the connection point is electrically connected to unshared anode or cathode of the corresponding light emitter unit;
  the light receiver module includes: multiple detector units; each detector unit includes a detecting region and a connection point; and at least one detector unit and one light emitter unit form a detection channel.

Optionally, the light emitter unit includes two light emitting regions; each light emitting region includes at least one of the light emitter points; the two light emitting regions share a cathode; and each light emitting region has a connection point.

Optionally, the multiple light emitter units of the light emitter module are arranged in multiple columns in a vertical direction, and the multiple columns of light emitter units are staggered from each other, to cause the detection beams emitted by the various light emitter units to be staggered from each other in a vertical direction;

the multiple detector units of the light receiver module are arranged in multiple columns in the vertical direction, and the multiple columns of detector units are staggered from each other; and the field of view of each detector unit overlaps with the field of view of the emitter unit corresponding to the detector unit.

Optionally, the light emitter units are independently packaged lasers, and each light emitting region has an individual substrate.

Optionally, at least some of the multiple light emitter units of the light emitter module are integrated and packaged into a single light emitter.

The light emitter module further includes: a driver; the driver includes multiple driver units; and each driver unit is configured to drive the corresponding light emitter unit of the light emitter to emit the detection beam.

Optionally, the connection points and the light emitting regions of the various light emitter units of the light emitter are arranged in columns, respectively.

Optionally, the light emitter includes:

multiple columns of staggered light emitting regions; and connection points that are arranged in a single column and correspond to the various light emitting regions, and the connection points arranged in the single column are arranged in a side region of the light emitter;

the driver is arranged on one side close to the connection points of the light emitter units of the light emitter; and connection points of the various driver units are electrically connected to connection points of the corresponding light emitter units, respectively.

Optionally, the light emitter module includes multiple light emitters and multiple drivers, and the multiple light emitters are arranged in multiple columns in the vertical direction, and the multiple columns of light emitters are staggered from each other; and the multiple drivers are arranged on one sides of the corresponding light emitters close to the connection points of the light emitter units, respectively.

Optionally, the light emitter module includes two columns of light emitters, and the two columns of light emitters are arranged in a centrosymmetric manner; and the connection points of the light emitter units of each light emitter are located in an outer side region of a light emitting region formed by the light emitting regions of the light emitter units in the two columns of light emitters.

Optionally, the light emitter includes two columns of light emitter units arranged in the vertical direction; the two columns of light emitter units are staggered from each other, and a light emitting region formed by the light emitting regions of the two columns of light emitter units is located in a middle region of the light emitter; and the connection points are arranged in a side region of the light emitter, respectively.

Optionally, each light emitter corresponds to two drivers which are arranged on one side of the corresponding light emitter close to the connection points of the corresponding column of light emitter units, respectively.

Optionally, the light emitter module includes multiple light emitters and multiple drivers.

The multiple light emitters are arranged in multiple columns in the vertical direction, and the multiple columns of light emitters are staggered from each other; and the multiple drivers are arranged on one sides of the connection points of the corresponding columns of light emitter units of the corresponding light emitters, respectively.

Optionally, at least some of the multiple detector units of the light receiver module are integrated and packaged into a single light detector.

Optionally, the multiple detector units of the light detector are distributed in multiple columns in the vertical direction, and the multiple columns of detector units are staggered from each other, to cause main axes of the fields of view of the detector units to be offset from each other.

Optionally, the light detector includes two columns of detector units, and each detector unit includes a detecting region and two connection points corresponding to the detecting region; the detecting regions of the light detector are arranged in two columns and located in a middle region of the light detector in a staggered manner; and the connection points corresponding to the detecting regions are arranged in a side region of the light detector.

Optionally, the light receiver module includes multiple columns of light detectors, and the multiple columns of detectors are arranged in a staggered manner and correspond to positions of the corresponding light emitters.

Optionally, the light emitter includes a vertical cavity surface emitting laser, and the light detector includes a silicone photomultiplier.

The embodiments of this disclosure further provide a LiDAR, including:

a light emitter and receiver module, configured to emit a detection beam, receive an echo beam reflected by a target object, and convert the echo beam into an electrical signal; and a processor module, configured to control the light emitter and receiver module to emit the detection beam, and determine target object measurement information based on the detection beam and the electrical signal corresponding to the echo beam.

The light emitter and receiver module includes: a light emitter module and a light receiver module, and the light emitter module is configured to emit a detection beam;

the light receiver module is configured to receive an echo beam of the detection beam reflected by the target object and convert the echo beam into the electrical signal;

a field of view of the light emitter module configured to overlap vertically with a field of view of the light receiver module, in a first direction, a size of the field of view of the light emitter module is larger than a size of the field of view of the light receiver module; in a second direction, a size of the field of view of the light emitter module is smaller than a size of the field of view of the light receiver module; and the first direction is perpendicular to the second direction.

By the use of the light emitter and receiver module based on the embodiments of this disclosure, the field of view of the light emitter module overlaps vertically with the field of view of the light receiver module, and an overlapping region of the field of view of the light emitter module and the field of view of the light receiver module is a focal plane corresponding to an effective field of view. In the first direction, the size of the field of view of the light emitter module is larger than the size of the field of view of the light receiver module, and in the second direction, the size of the field of view of the light emitter module is smaller than the size of the field of view of the light receiver module; and the first direction is perpendicular to the second direction. From the perspective of a light alignment margin effect, allowable errors of the light emitter module and the light receiver module are consistent in the first direction and the second direction, and the design margin of the light-emitting surface of the light emitter module and the design margin of the light-sensing surface of the light receiver module can be improved. In such a case, the light alignment accuracy can be improved, and the consistency and stability of the distance measurement capabilities of various channels can be ensured.

Further, the light emitter module includes: multiple light emitter units; the multiple light emitter units share a common cathode or a common anode, and each light emitter unit has a connection point; and the connection point is electrically connected to unshared anode or cathode of the corresponding light emitter unit. Because the cathodes or anodes of the multiple light emitter units are shared, an area of the connection point of each light emitter unit can be reduced, and the energy and arrangement density of the light emitter module can be increased. Furthermore, each detector unit and one corresponding light emitter unit form a detection channel, and one light emitter unit can include multiple light emitter points. In such a case, the energy densities of the various detection channels can be increased, and the energy utilization rate can be increased. In such a case, by the use of the light emitter and receiver module including the light emitter module and the light receiver module described above, the detection accuracy can be improved.

Further, the multiple light emitter units of the light emitter module are arranged in multiple columns in the vertical direction, and the multiple columns of light emitter units are staggered from each other, to cause the detection beams emitted by the light emitter units to be staggered from each other in the vertical direction. And, accordingly, the multiple detector units of the light receiver module are also arranged in multiple columns in the vertical direction, and the multiple columns of detector units are staggered from each other. The field of view of each detector unit overlaps with the field of view of the emitter unit corresponding to the detector unit. In such a case, the vertical resolution of the light emitter and receiver module and the vertical resolution of the LiDAR including the light emitter module can be improved, and the density of a detected laser point cloud can be increased.

Further, at least some of the multiple light emitter units of the light emitter module are integrated and packaged into a light emitter. Gaps between the various light emitter units inside the light emitter can be further reduced, and the density of the light emitter units per unit area can be larger. In combination with the driver that includes the multiple driver units for driving, the overall size of the entire light emitter module can be reduced, and the volume of the LiDAR applying the light emitter module can be reduced.

Further, the light emitter includes two columns of light emitter units arranged in the vertical direction; the two columns of light emitter units are staggered from each other, and a light emitting region formed by the light emitting regions of the two columns of light emitter units is located in a middle region of the light emitter; and the connection points are arranged in a side region of the light emitter, respectively. The overall size of the light emitter module can be further reduced, and the energy utilization rate is further increased.

BRIEF DESCRIPTION OF THE DRAWINGS

To describe the technical solutions in the embodiments of this disclosure or in the related art more clearly, the following briefly introduces the accompanying drawings for describing the embodiments or the related art. Clearly, the accompanying drawings in the following description show merely the embodiments of this disclosure, and a person of ordinary skill in the art may still derive other drawings from the provided accompanying drawings without creative efforts.

DETAILED DESCRIPTION

Figure 1:
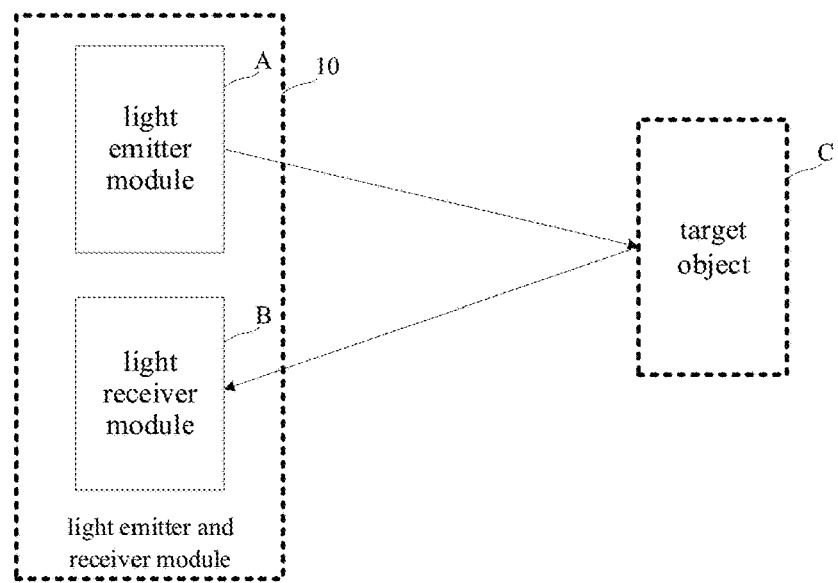
FIG. 1 shows a schematic structural diagram of a light emitter and receiver module, provided in embodiments of this disclosure.

To improve the light alignment accuracy and ensure the consistency and stability of the distance measurement capabilities of various emitting and receiving channels, the embodiments of this disclosure provide a corresponding light emitter and receiver module and a LiDAR using the light emitter and receiver module. Fields of view of a light emitter module and a light receiver module of the light emitter and receiver module vertically overlap with each other. In addition, in a first direction, a size of the field of view of the light emitter module is larger than a size of the field of view of the light receiver module, and in a second direction, a size of the field of view of the light emitter module is smaller than a size of the field of view of the light receiver module; and the first direction is perpendicular to the second direction.

By the use of the above light emitter and receiver module, from the perspective of a light alignment margin effect, allowable errors of the light emitter module and the light receiver module are consistent in the first direction and the second direction, so that the design margin of a light-emitting surface of the light emitter module and the design margin of a light-sensing surface of the light receiver module can be improved. In such a case, the light alignment accuracy can be improved, and the consistency and stability of the distance measurement capabilities of various channels can be ensured.

To enable those skilled in the art to better understand the technical concepts and technical principles of the embodiments of this disclosure and to understand the technical advantages and effects thereof, some specific application embodiments are described in detail below in conjunction with the accompanying drawings.

First, the embodiments of this disclosure provide a light emitter and receiver module. Referring to the schematic structural diagram of a light emitter and receiver module shown in FIG. 1, the light emitter and receiver module 10 includes: a light emitter module A and a light receiver module B.

The light emitter module A is configured to emit a detection beam; and
  the light receiver module B is configured to receive an echo beam of the detection beam reflected by a target object C and converting the echo beam into an electrical signal.

A field of view of the light emitter module A overlaps vertically with a field of view of the light receiver module B. In a first direction, a size of the field of view of the light emitter module is larger than a size of the field of view of the light receiver module, and in a second direction, a size of the field of view of the light emitter module is smaller than a size of the field of view of the light receiver module; and the first direction is perpendicular to the second direction.

Based on the above embodiment, the field of view of the light emitter module A and the field of view of the light receiver module B are overlapped with each other, forming a certain overlapping region which is an effective field of view region.

For example, when a field of view coverage region of the light emitter module A and a field of view coverage region of the light receiver module B are both rectangular, the first direction and the second direction correspond to two perpendicular side length directions, respectively. For the light emitter module A, the size of the field of view in the first direction is V1, and the size of the field of view in the second direction is H1. For the light receiver module B, the size of the field of view in the first direction is V2, and the size of the field of view in the second direction is H2, V1>V2, H1<H2. If the light emitter module A and the light receiver module B use the above sizes of the fields of view, respectively, a corresponding effective field of view area is V2*H1/$f^2$, f is a focal length.

Figure 2A:
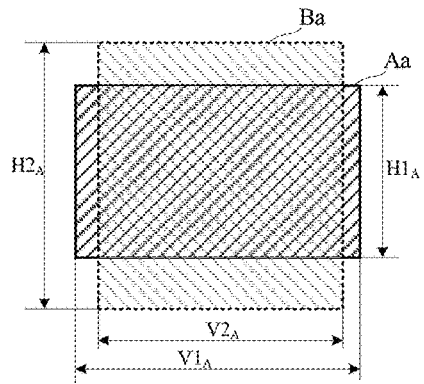
FIG. 2A and FIG. 2B show schematic diagrams of optional embodiments of a relationship between fields of view of a light emitter module and a light receiver module in a light emitter and receiver module, provided in embodiments of this disclosure.
Figure 2B:
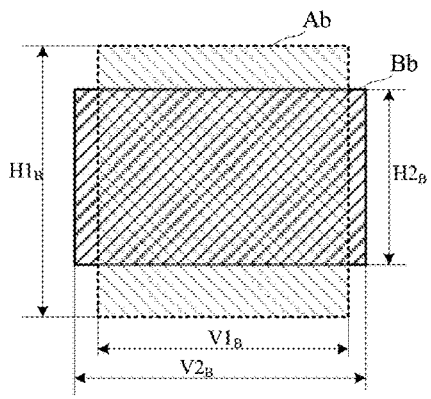

FIG. 2A and FIG. 2B show schematic diagrams of optional embodiments of a relationship between fields of view of a light emitter module and a light receiver module of a light emitter and receiver module. Coverage regions of the field of view of the light emitter module A and the field of view of the light receiver module B are both rectangular.

Firstly, referring to an embodiment of the relationship between fields of view of the light emitter module A and the light receiver module B shown in FIG. 2A, assuming that the first direction is a horizontal direction and the second direction is a vertical direction, for the light emitter module A, the size of the field of view Aa in the horizontal direction is $V1_A$, and the size in the vertical direction is $H1_A$, $V1_A > H1_A$. For the light receiver module B, the size of the field of view Ba in the horizontal direction is $V2_A$, and the size in the vertical direction is $H2_A$, and $H2_A > V2_A$. As shown in FIG. 2A, in the horizontal direction, the size $V1_A$ of the field of view of the light emitter module A is larger than the size $V2_A$ of the field of view of the light receiver module B, that is, $V1_A > V2_A$; and in the vertical direction, the size $H1_A$ of the field of view of the light emitter module A is smaller than the size HA2 of the field of view of the light receiver module B, that is, $H1_A < H2_A$.

Then, referring to another embodiment of the relationship between fields of view of the light emitter module A and the light receiver module B shown in FIG. 2B, assuming that the first direction is a vertical direction and the second direction is a horizontal direction, for the light emitter module A, the size of the field of view Ab in the horizontal direction is $V1_B$, and the size in the vertical direction is $H1_B$, $V1_B < H1_B$. For the light receiver module B, the size of the field of view Bb in the horizontal direction is $V2_B$, and the size in the vertical dimension is $H2_B$, and $H2_B < V2_B$. As shown in FIG. 2B, in the horizontal direction, the size $V1_B$ of the field of view of the light emitter module A is smaller than the size $V2_B$ of the field of view of the light receiver module B, that is, $V1_B < V2_B$; and in the vertical direction, the size $H1_B$ of the field of view of the light emitter module A is larger than the size $H2_B$ of the field of view of the light receiver module B, that is, $H1_B > H2_B$.

It can be seen from the above embodiments that by the use of the above light emitter and receiver module, main energy of a light spot returned by the detection beam emitted by the light emitter module A is distributed on an effective area of the light receiver module, and can form an approximate "cross" shape. If the light spot of the light emitter module is wider than the light receiver module in the horizontal direction, the light spot of the light emitter module is smaller than the light receiver module in the vertical direction. If the light spot of the light emitter module is narrower than the light receiver module in the horizontal direction, the light spot of the light emitter module is smaller than the light receiver module in the vertical direction. In this way, when there are light alignment errors such as an optical error, a structural error, a patch error, and a temperature drift error, the same overlapping area and distance measurement capability can still be maintained. In such a case, the light alignment accuracy can be improved, and the consistency and stability of the distance measurement capabilities of various emitting and receiving channels can be ensured.

Those skilled in the art can understand that the above is only an illustrative description, and the embodiments of this disclosure do not impose any limitation on specific distribution shapes of the light emitter module A and the light receiver module B and on shapes and specific sizes of the fields of view of the light emitter module A and the light receiver module B (e.g., the light emitter module, the light receiver module, and the fields of views corresponding to the light emitter module and the light receiver module can be elliptical, rhombic, or the like). In addition, the embodiments of this disclosure do not limit specific directions of the first direction and the second direction, as long as the first direction is perpendicular to the second direction, the fields of view of the light emitter module and the light receiver module vertically overlap with each other, and the light emitter module and the light receiver module satisfy the above size relationships in the first direction and the second direction that are perpendicular to each other.

In addition, it should be noted that the light emitter and receiver module 10 shown in FIG. 1 is not used to limit an actual relative positional relationship between the light emitter module and the light receiver module. The light emitter and receiver module formed by the light emitter module and the light receiver module can be a paraxial system or a coaxial system, as long as the fields of view of the light emitter module and the light receiver module are intersected with each other perpendicularly, satisfy the above relationships, and can overlap perpendicularly. The target object C is only an embodiment of any object that can be detected and does not represent a specific object.

In some embodiments, the light emitter module can use various types of light emitters. In embodiments of this disclosure, a laser is taken as an example. More specifically, the laser can use a VCSEL or a PCSEL. Similarly, the light receiver module can also use various types of light detectors. In embodiments of this disclosure, an SiPM and a SPAD(s) are taken as an example. It can be understood that the specific embodiments of light emitter and the light detector in this disclosure are not used to limit the protection scope of this disclosure, but are merely illustrative examples to facilitate understanding in conjunction with specific application scenarios.

In some embodiments of this disclosure, the light emitter module can specifically include multiple light emitter units; each light emitter unit includes multiple light emitter points; the multiple light emitter units share a common cathode or a common anode; and each light emitter unit has a connection point; the connection point is electrically connected to unshared anode or cathode of the corresponding light emitter unit. The light receiver module can include multiple detector units; each detector unit includes a detecting region and a connection point; and at least one detector unit and one light emitter unit form a detection channel.

In specific implementations, fields of view of various detector units can all be relatively vertically overlapping with fields of view of the light emitter units corresponding to the detector units, and in the first direction, sizes of the fields of view of the various light emitter units are larger than sizes of the fields of view of the corresponding detector units, and in the second direction, sizes of the fields of view are smaller than sizes of the fields of view of the corresponding detector units.

When there are light alignment errors such as an optical error, a structural error, a patch error, and a temperature drift error, by causing fields of view of various detector units to relatively vertically overlap with fields of view of the light emitter units corresponding to the detector units and satisfying the above size correspondence relationships, it is possible to ensure that point clouds detected by the various detection channels, namely, an effective area of each point cloud on a focal plane, or an effective detection angle range of each point cloud of a LiDAR, can maintain the same overlapping area and distance measurement capability. In such a case, the light alignment accuracy can be improved, and the consistency and stability of the distance measurement capabilities of various emitting and receiving channels can be ensured.

In some embodiments, the connection points can be specifically wire bonding pads or wiring components in other forms.

In some embodiments of this disclosure, each light emitter unit includes two light emitting regions; the two light emitting regions share a cathode; and each light emitting region has a connection point. In a specific embodiment, referring to the schematic structural diagram of a light emitter unit shown in FIG. 3A, the light emitter unit 3a includes a light emitting region 31A and a light emitting region 32A. The light emitting region 31A and the light emitting region 32A share the cathode. The light emitting region 31A has a connection point 31a, and the light emitting region 32A has a connection point 32a. In some embodiments, the light emitter unit 3a can be an independently packaged laser, the light emitting region 31A and the light emitting region 32A each have individual substrates.

Figure 3A:
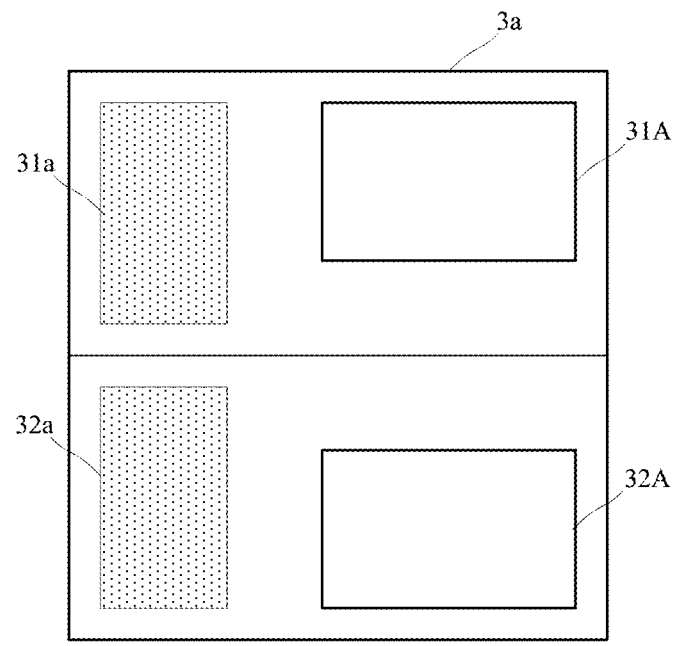
FIG. 3A shows a schematic structural diagram of a light emitter unit, provided in embodiments of this disclosure.
Figure 3B:
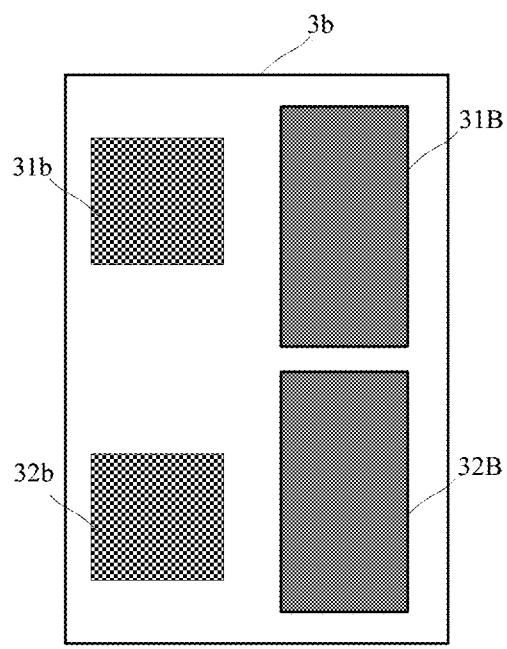
FIG. 3B shows a schematic structural diagram of a detector unit corresponding to the light emitter unit shown in FIG. 3A.

In some embodiments of this disclosure, corresponding to the light emitter unit shown in FIG. 3A, the detector unit 3b shown in FIG. 3B can be used. Specifically, the detector unit 3b includes two detecting regions, namely a detecting region 31B and a detecting region 31B. The detecting region 31B corresponds to a connection point 31b, and the detecting region 32B corresponds to a connection point 32b.

It can be understood that a detector unit can also include only one detecting region. Regardless of the quantity of detecting regions included in one detector unit, in some embodiments, one detecting region can correspond to one or more light emitting regions, or one light emitting block can correspond to multiple detecting regions.

In some embodiments of this disclosure, the multiple light emitter units of the light emitter module are arranged in multiple columns in the vertical direction, and the multiple columns of light emitter units are staggered from each other, to cause the detection beams emitted by the light emitter units to be staggered from each other in the vertical direction. Correspondingly, the multiple detector units of the light receiver module are also arranged in multiple columns, and the multiple columns of detector units are staggered from each other. The field of view of each detector unit vertically overlaps with the field of view of the corresponding light emitter unit. If each light emitter unit includes multiple light emitting regions, each light emitting region has a detecting region with a field of view vertically overlapping with the light emitting region.

Figure 4A:
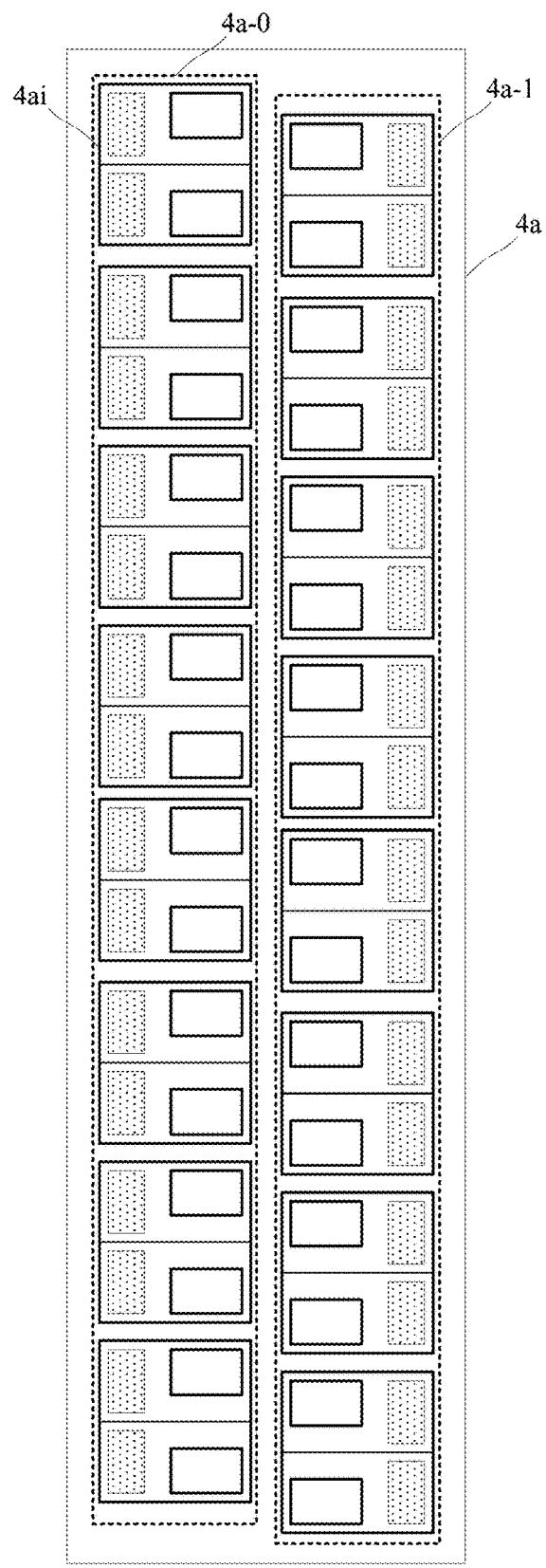
FIG. 4A shows a schematic diagram of a layout structure of multiple lasers of a light emitter module, provided in embodiments of this disclosure.
Figure 4B:
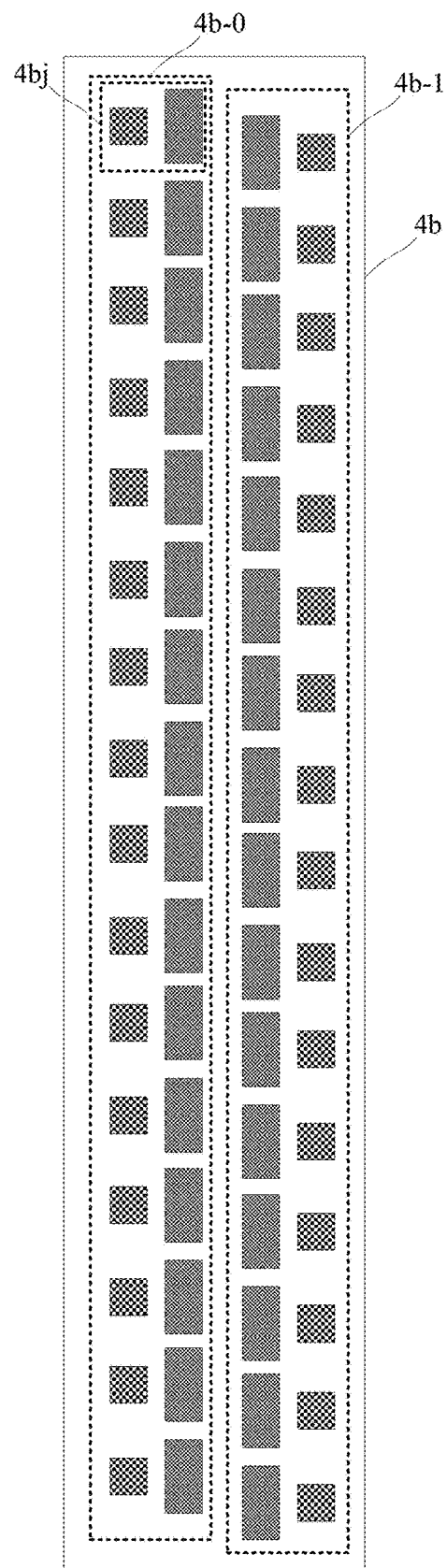
FIG. 4B shows a schematic diagram of a layout structure of detector units of a light receiver module corresponding to the light emitter module shown in FIG. 4A.

In a specific embodiment, referring to FIG. 4A and FIG. 4B, a specific layout structure of a light emitter module and a light receiver module are shown.

First, referring to a schematic diagram of a layout structure of multiple lasers in a light emitter module shown in FIG. 4A, the light emitter module 4a includes two columns (namely, column 4a-0 column and column 4a-1) of multiple lasers 4ai arranged in the vertical direction. The lasers in column 4a-0 and the lasers in column 4a-1 are staggered from each other. In this way, the detection beams emitted by the lasers 4*ai* can be staggered from each other in the vertical direction. More specifically, as shown in FIG. 4A, each laser 4*ai* includes two light emitting regions, and each light emitting region has a corresponding connection point.

Then, referring to FIG. 4B, showing a schematic diagram of a layout structure of detector units in a light receiver module corresponding to the light emitter module shown in FIG. 4A, the light receiver module 4*b* includes two columns (namely, column 4*b*-0 and column 4*b*-1) of multiple detectors 4*bj* arranged in the vertical direction. The detectors in column 4*b*-0 and the detectors in column 4*b*-1 are staggered from each other. In this way, the echo beams of the detectors 4*bj* can be staggered from each other in the vertical direction (namely, the main axis of the field of view). Each detector 4*bj* includes a detecting region, and each detecting region has a corresponding connection point.

Referring to FIG. 4A and FIG. 4B, each laser 4*ai* in FIG. 4A corresponds to two detectors 4*bj* in FIG. 4B. By the use of the light emitter and receiver module including the light emitter module 4*a* shown in FIG. 4A and the light receiver module 4*b* shown in FIG. 4B, each laser 4*ai* has the detector 4*bj* with the field of view that vertically overlaps the laser. In such a case, from the perspective of a light alignment margin effect, each laser and each detector both have certain allowable errors in the horizontal direction or the vertical direction, and the allowable errors in the two directions are consistent, accordingly, the overall design margin of the light-emitting surface of the light emitter module and the light-sensing surface of the light receiver module can be increased. The light alignment accuracy can be improved, and the consistency and stability of the distance measurement capabilities of various channels can be ensured.

Moreover, through the staggered arrangement of the multiple columns of lasers in the light emitter module and the staggered distribution of the multiple columns of detectors in the corresponding light receiver module, the vertical resolution of the light emitter module and the vertical resolution of a LiDAR including the light emitter module can be improved. In such a case, the density of a detected laser point cloud can be increased.

In some embodiments, the connection points of the two columns of staggered lasers can be located on the same side of the light emitter module. Correspondingly, the connection points of two columns of staggered detectors can be located on the same side of the light receiver module.

To increase the energy utilization rate of the light emitter module, as shown in FIG. 4A, the various lasers 4*ai* of the light emitter module 4*a* are arranged in a centrosymmetric manner, and the light emitting regions of the various lasers 4*ai* in the two columns of lasers 4*a*-0 and 4*a*-1 are all located in a middle region of the light emitter module 4*a*, and the connection points are arranged in a side region of the light emitter module 4*a*, respectively. Correspondingly, continuing to refer to FIG. 4B, the two columns of light detectors 4*b*-0 and 4*b*-1 of the light receiver module 4*b* are arranged in a centrosymmetric manner, and the detecting regions of the two columns of light detectors 4*bj* are located in a middle region of the light receiver module 4*b*, and the connection points are respectively arranged in a side region of the light receiver module 4*b*.

In some embodiments, to improve the integration level of the device and reduce the volume of the LiDAR, at least some of the multiple light emitter units of the light emitter module can be integrated and packaged into a light emitter. Similarly, at least some of the multiple detector units can also be integrated and packaged into a light detector. Specifically, two or more light emitter units can be packaged into a light emitter, and two or more detector units can be packaged into a light detector. In applications of the LiDAR, based on a desired detection accuracy, if a specific application needs 128-line LiDAR and each light emitter unit only includes one light emitting region, eight light emitters formed by packaging 16 light emitter units can be used. Correspondingly, if each detector unit only includes one detecting region, eight light detectors formed by packaging 16 detector units can be used.

In a specific application process, the light emitter module can further include a driver; the driver can include multiple driver units; and each driver unit is configured to drive, in response to a driving signal, the corresponding light emitter unit of the light emitter to emit the detection beam.

To improve the integration level of the device and facilitate wiring, the connection points and the light emitting regions of the various light emitter units of the light emitter can be arranged in columns.

In some embodiments of this disclosure, the light emitter includes: multiple columns of staggered light emitting regions; and connection points that are arranged in a single column and correspond to the various light emitting regions, and the connection points arranged in the single column are arranged in a side region of the light emitter. Correspondingly, the driver is arranged on one side close to the connection points of the light emitter units of the light emitter. The connection points of the various driver units are respectively electrically connected to the connection points of the corresponding light emitter units.

As mentioned above, in specific embodiments, the light emitter module can include multiple light emitters and multiple drivers. The multiple light emitters can be arranged in multiple columns in the vertical direction, and the multiple columns of light emitters are staggered from each other; and the multiple drivers can be arranged on one sides of the corresponding light emitters close to the connection points of the light emitter units, respectively.

Figure 5A:
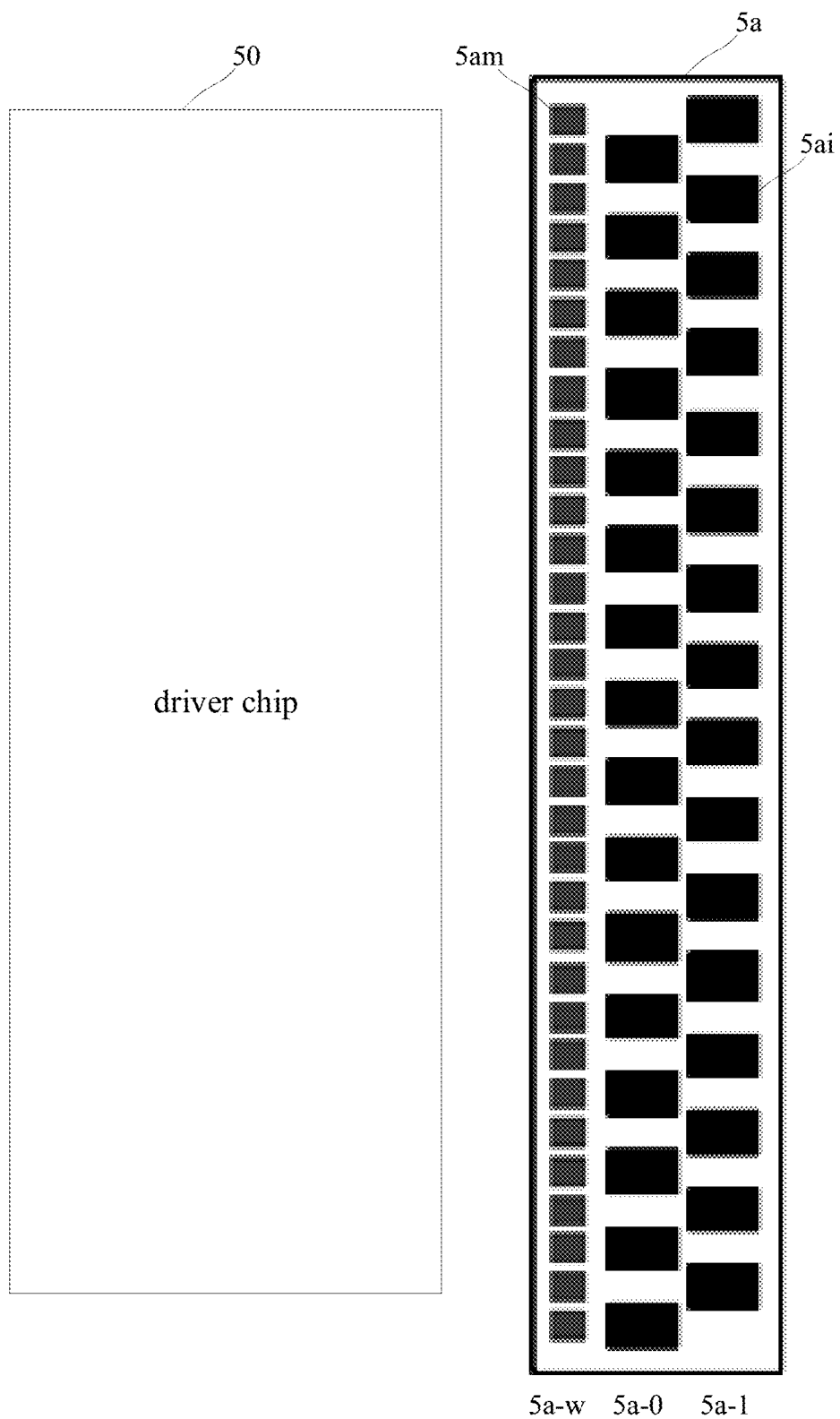
FIG. 5A shows a schematic diagram of a layout structure of a light emitter, provided in embodiments of this disclosure.

Referring to a schematic diagram of a layout structure of a light emitter shown in FIG. 5A. The light emitter 5*a* includes two columns (column 5*a*-0 and column 5*a*-1) of light emitting regions 5*ai* located on a right side part of the light emitter. The two columns of light emitting regions 5*ai* are distributed in a staggered manner; and a column (5*a*-*w*) of connection points 5*am* located in a left side region of the light emitter 5*a*. For the light emitter 5*a* shown in FIG. 5A, single-sided driving can be used. For example, a driver chip 50 is arranged on a left side of the light emitter 5*a*, and the various driver units (not shown) in the driver chip 50 are electrically connected to the connection points 5*am* of the corresponding light emitter units through the connection points (not shown), respectively.

Figure 5B:
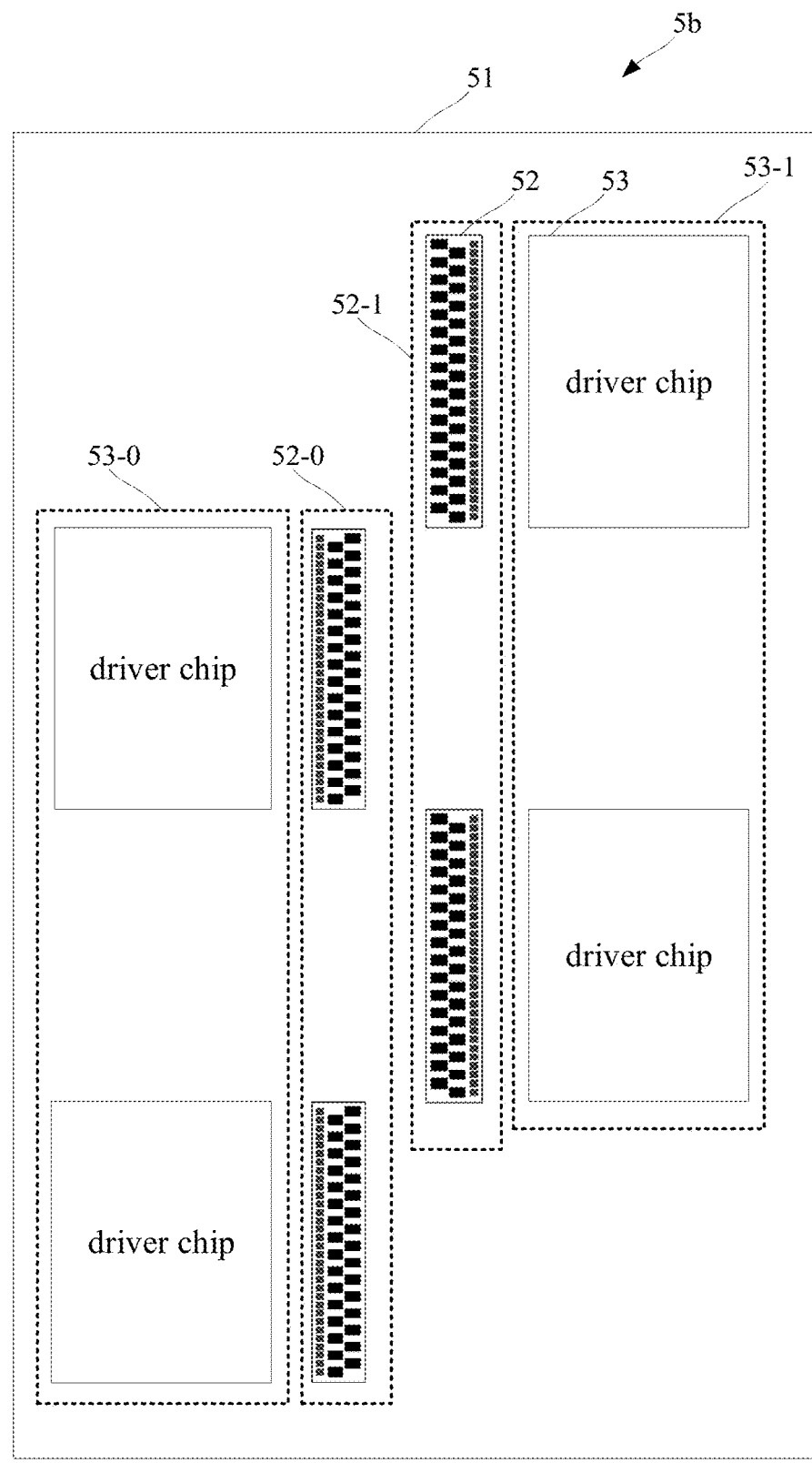
FIG. 5B shows a schematic diagram of a layout structure of a light emitter module using the light emitter shown in FIG. 5A.

In an embodiment of this disclosure, a light emitter module using the light emitter shown in FIG. 5A is as shown in FIG. 5B. The light emitter module 5*b* can include multiple light emitters 52, and the multiple light emitters 52 are distributed in two columns (namely, column 52-0 and column 52-1) in a staggered manner. Optionally, the two columns of light emitters 52 are arranged in a centrosymmetric manner; and the connection points 5*am* of the light emitter units of each light emitter 52 are all located in an outer side region of a light emitting region formed by the light emitting regions of the light emitter units in the two columns of light emitters 52. Correspondingly, each light emitter 52 is configured with one driver chip 53, and each driver chip 53 is located on one side of the corresponding light emitter 52 close to the connection point region, that is, the single-sided driving way is used. As shown in FIG. 5B, two columns (namely, column 53-0 and column 53-1) of driver chips are correspondingly arranged on two sides of a middle light emitting region formed by the light emitters. In some embodiments, the light emitter module 5b can also include a light emitter circuit board 51, and the various light emitters 52 and driver chips 53 can be arranged on the light emitter circuit board 51 based on the layout shown in FIG. 5B.

In a specific embodiment, referring to FIG. 5B, any two adjacent light emitters 52 in the two columns of light emitters can be connected to each other in the vertical direction and compactly distributed to form an HDID linear array, which further increases the size of the field of view of the light emitter and receiver module in the vertical direction.

It should be noted that the specific layout structure of the light emitters is not limited to the structure of the above embodiment. In some embodiments, different layout structures can be used based on requirements. Another layout structure is shown below.

In a specific embodiment, the light emitter includes two columns of light emitter units arranged in the vertical direction; the two columns of light emitter units are staggered from each other, and a light emitting region formed by the light emitting regions of the two columns of light emitter units is located in a middle region of the light emitter; and the connection points are arranged in a side region of the light emitter, respectively. If the light emitter with this layout structure is used, in an optional embodiment, each light emitter in the light emitter module corresponds to two drivers which can be arranged on one side of the corresponding light emitter close to the connection points of the corresponding column of light emitter units, respectively, namely, double-sided driving is used. When the double-sided driving is used, the size of the light emitter can be further reduced, and the energy utilization rate is higher.

Figure 6A:
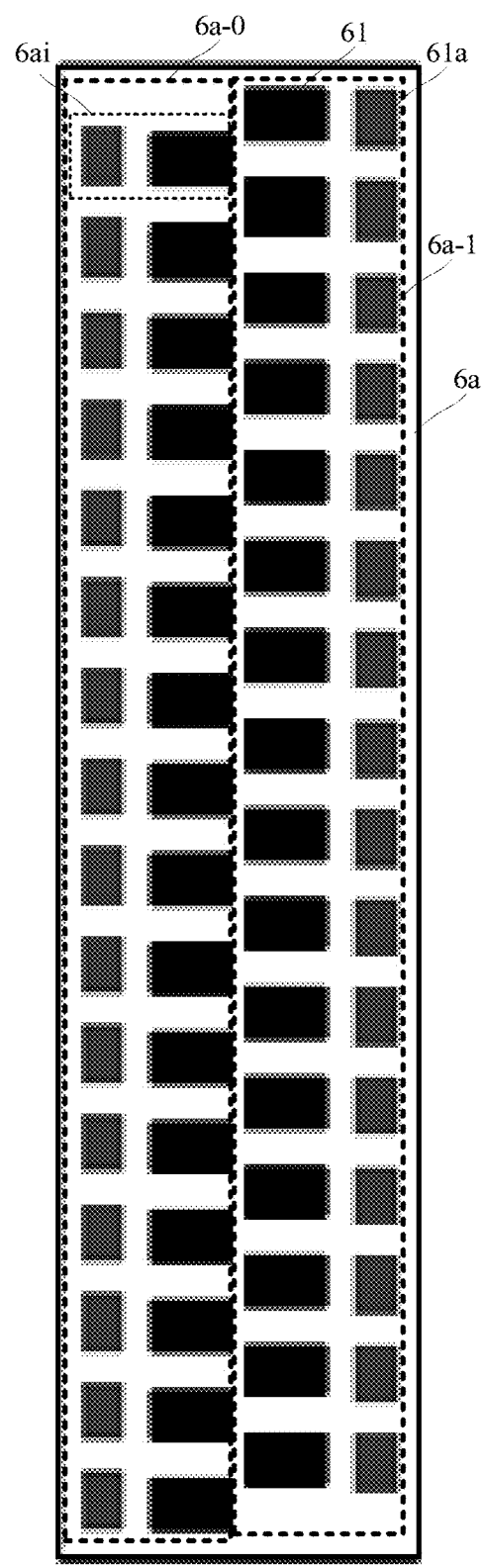
FIG. 6A shows a schematic diagram of a layout structure of another light emitter, provided in embodiments of this disclosure.

Referring to a schematic diagram of a layout structure of a light emitter shown in FIG. 6A, in other embodiments of this disclosure, to further optimize the performance of the LiDAR, double-sided driving can be used. Firstly, as shown in FIG. 6A, the light emitter 6a includes two columns (namely, column 6a-0 and column 6a-1) of light emitter units 6ai arranged in the vertical direction; the two columns (namely, column 6a-0 and column 6a-1) of light emitter units 6ai are staggered from each other, and light emitting regions 61 of the two columns of light emitter units is located in a middle region of the light emitter 6a; and connection points 61a are arranged in a side region of the light emitter 6a, respectively.

For the light emitter shown in FIG. 6A, in a specific application process, to drive the light emitter to emit light, two driver chips can be arranged on left and right sides of the light emitter 6a, respectively, and connection points of driver units in the driver chips are electrically connected to connection points of the corresponding light emitter units 6ai on the corresponding sides, respectively.

Figure 6B:
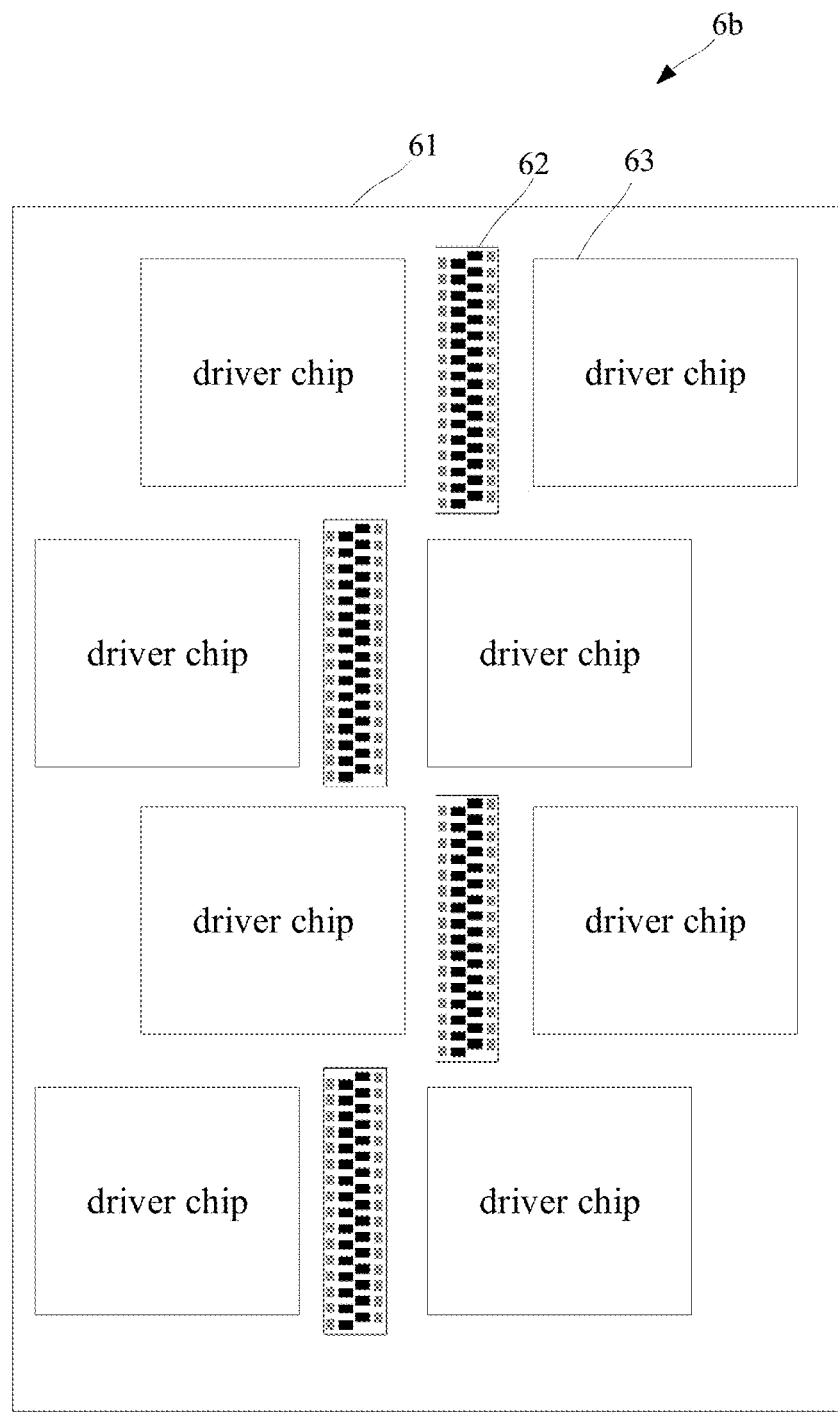
FIG. 6B shows a schematic diagram of a layout structure of a light emitter module using the light emitter shown in FIG. 6A.

In an embodiment of this disclosure, a light emitter module using the light emitter shown in FIG. 6A is as shown in FIG. 6B. The light emitter module 6b can include multiple light emitters 62, and the multiple light emitters 62 are distributed in two columns in a staggered manner. Optionally, the two columns of light emitters 62 are arranged in a centrosymmetric manner; and the connection points of the light emitter units of each light emitter 62 are all located in an outer side region of a light emitting region formed by light emitting regions of the light emitter units in the two columns of light emitters 62. Correspondingly, each light emitter 62 is configured with two driver chips 63, and the two driver chips 63 are located on one side of the corresponding light emitter 62 close to the connection point region, respectively, that is, the double-sided driving way is used. As shown in FIG. 6B, two columns of driver chips are correspondingly arranged on two sides of a middle light emitting region formed by the light emitters 62. In some embodiments, the light emitter module 6b can also include a light emitter circuit board 61, and the various light emitters 62 and driver chips 63 can be arranged on the light emitter circuit board 61 based on the layout shown in FIG. 6B.

In a specific embodiment, continuing to refer to FIG. 6B, any two adjacent light emitters 62 in the two columns of light emitters 62 can be connected to each other in the vertical direction and compactly distributed to form an HDID linear array, which further increases the size of the field of view of the light emitter module in the vertical direction.

As mentioned above, at least some of the multiple detector units of the light receiver module are integrated and packaged into a light detector. In some embodiments of this disclosure, the multiple detector units in the light detector are arranged in multiple columns in the vertical direction, and the multiple columns of detector units are staggered from each other, to cause the detector units to be staggered from each other in the vertical direction.

Figure 7A:
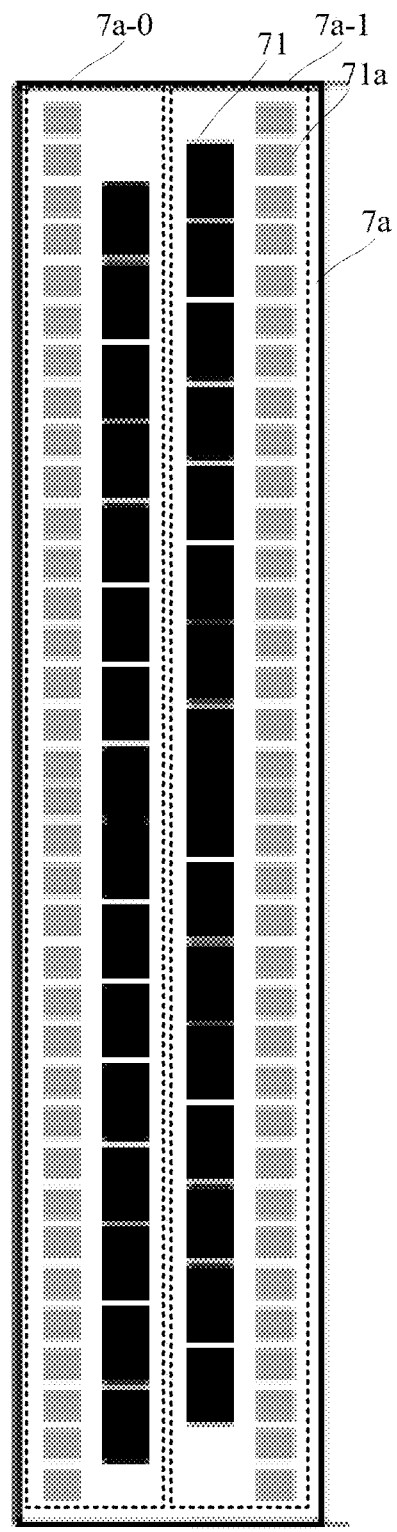
FIG. 7A shows a schematic diagram of a layout structure of a light detector, provided in embodiments of this disclosure.

Referring to a schematic diagram of a layout structure of a light detector shown in FIG. 7A, the light detector 7a includes two columns (column 7a-0 and column 7a-1) of detector units. Each detector unit can include one detecting region 71 and connection points 71a corresponding to the detecting region 71. One detecting region 71 can correspond to two connection points 71a. In addition, continuing to refer to FIG. 7A, in addition to the connection points corresponding to the detecting region 71, some other connection points can also be provided. For example, some connection points are configured to provide a control signal, or only serve as empty backup connection points. In optional embodiments, the light detector 7a includes two columns of detecting regions 71, and the detecting regions 71 are distributed in a staggered manner in a middle region of the light detector 7a, and the connection points 71a corresponding to the detecting regions 71 are arranged in a side region of the light detector 7a.

Figure 7B:
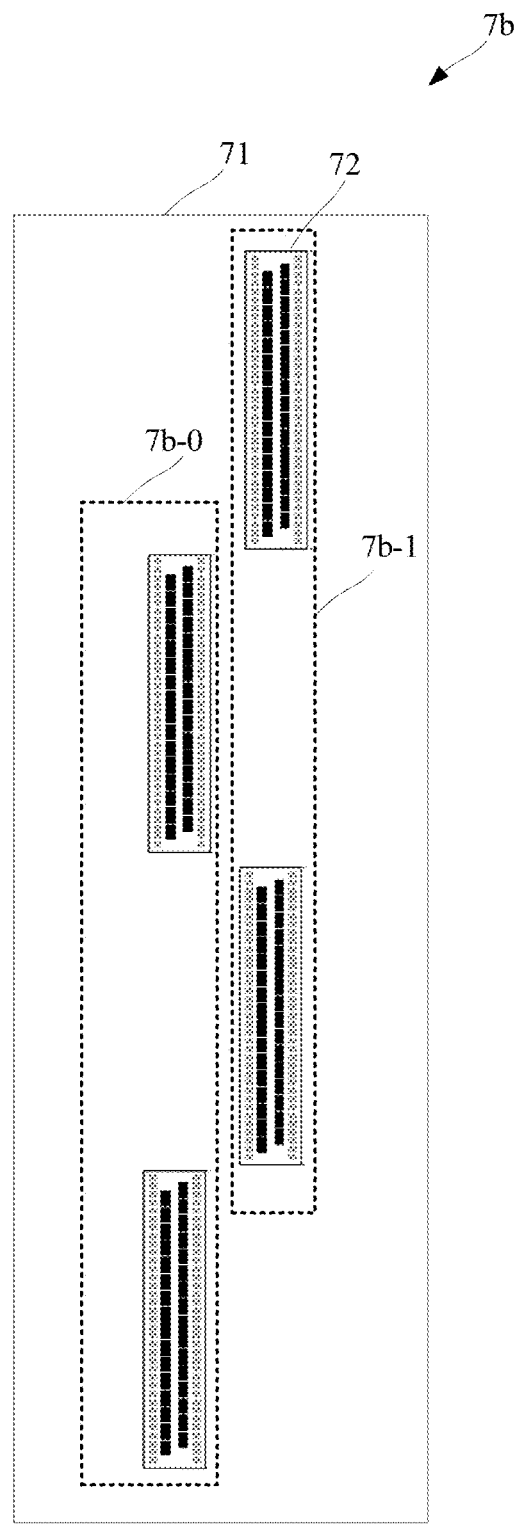
FIG. 7B shows a schematic diagram of a layout structure of a light receiver module using the light detector shown in FIG. 7A.

In some embodiments, if the light emitter module of the light emitter and receiver module includes multiple columns of light emitters, correspondingly, the light receiver module can include multiple columns of light detectors, and the multiple columns of detectors are distributed in a staggered manner and correspond to positions of the corresponding light emitters. Referring to a schematic diagram of a layout structure of the light receiver module shown in FIG. 7B, for example, if the light emitter module 6b shown in FIG. 6B uses the light detector 7a shown in FIG. 7A, the corresponding light receiver module can use the layout structure shown in FIG. 7B. Specifically, the light receiver module 7b can include: two columns (namely, column 7b-0 and column 7b-1) of light detectors 72 which are staggered from each other in the vertical direction. In some embodiments, the two columns can be arranged on a light receiver circuit board 71 and have a compact layout so as to reduce the size of the light receiver module 7b.

To enable those skilled in the art to more intuitively understand the technical effects of the use of the embodiments of this disclosure, simulation and comparison are performed on the detection rates of the light emitter and receiver modules with the layout structures in the solution of the embodiments of this disclosure and two prior arts.

Figure 8:
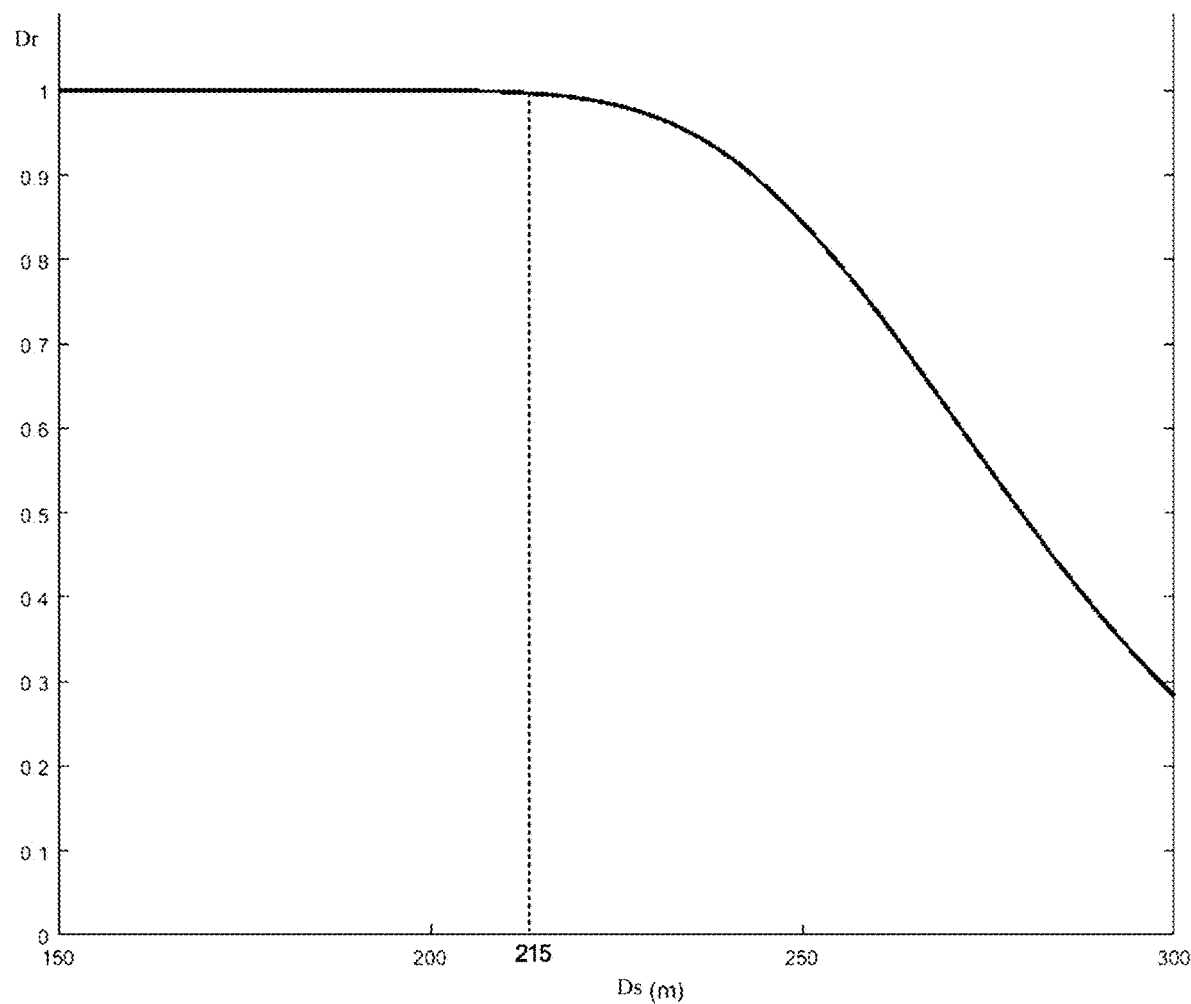
FIG. 8 shows a schematic diagram of simulation of a detection rate of a light emitter and receiver module that satisfies the field-of-view relationship shown in FIG. 2A.

FIG. 8 shows a schematic diagram of simulation of a light detection rate of a light emitter and receiver module that satisfies the field-of-view relationship shown in FIG. 2A. It can be seen that if the light emitter and receiver module that satisfies the field-of-view relationship shown in FIG. 2A is used, within a range where a detection distance Ds is approximately less than 220 m, the detection rate Dr basically remains at 1. After the detection distance Ds is greater than 220 m, the detection rate Dr begins to slowly decrease.

The following is a brief description of another two light emitter and receiver modules that have field-of-view relationships different from the relationship between fields of view the of light emitter module and the light receiver module in the light emitter and receiver module based on the embodiments of this disclosure.

Figure 9A:
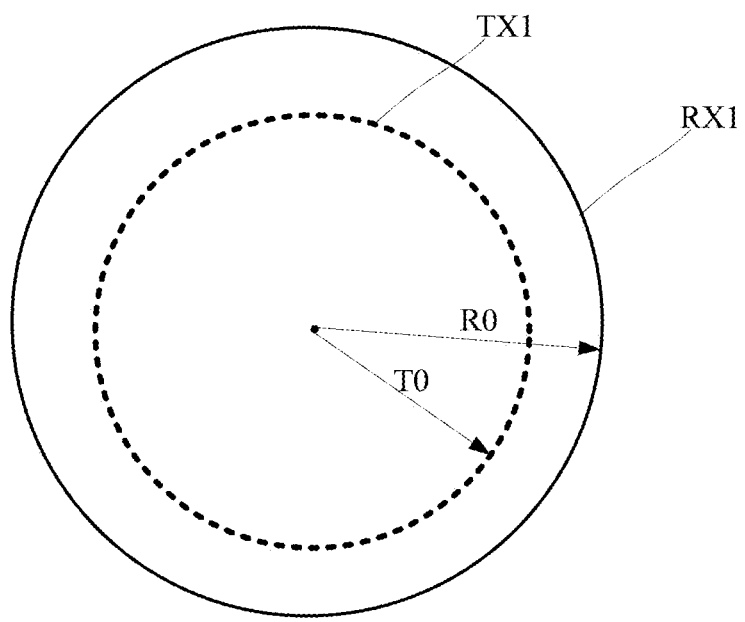
FIG. 9A shows a schematic diagram of a field-of-view relationship of a light emitter and receiver module in the prior art.
Figure 9B:
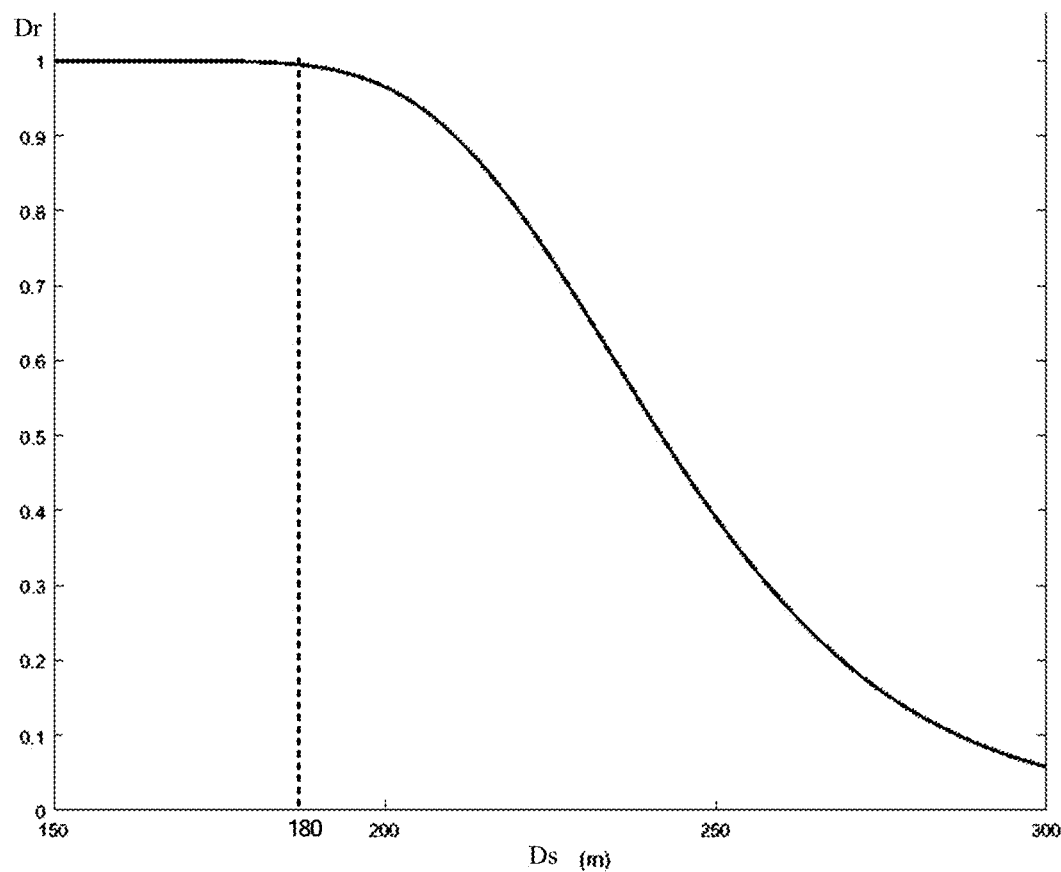
FIG. 9B shows a schematic diagram of simulation of a detection rate of a light emitter and receiver module that satisfies the field-of-view relationship shown in FIG. 9A.

In a light emitter and receiver module, the fields of view of both the light emitter module and the light receiver module are circular, and the size of the field of view of the light emitter module is smaller than the size of the field of view of the light receiver module. FIG. 9A shows a schematic diagram of a field-of-view relationship of a light emitter and receiver module. A radius T0 of a field of view TX1 of a light emitter module is smaller than a radius R0 of a light receiver module RX1, that is, T0<R0. FIG. 9B shows a schematic diagram of simulation of a detection rate of a light emitter and receiver module that satisfies the field-of-view relationship shown in FIG. 9A. It can be obviously seen that within a range where a detection distance Ds is approximately less than 180 m, the detection rate Dr basically remains at 1. After the detection distance Ds is greater than 180 m, the detection rate Dr begins to rapidly decrease.

Figure 10A:
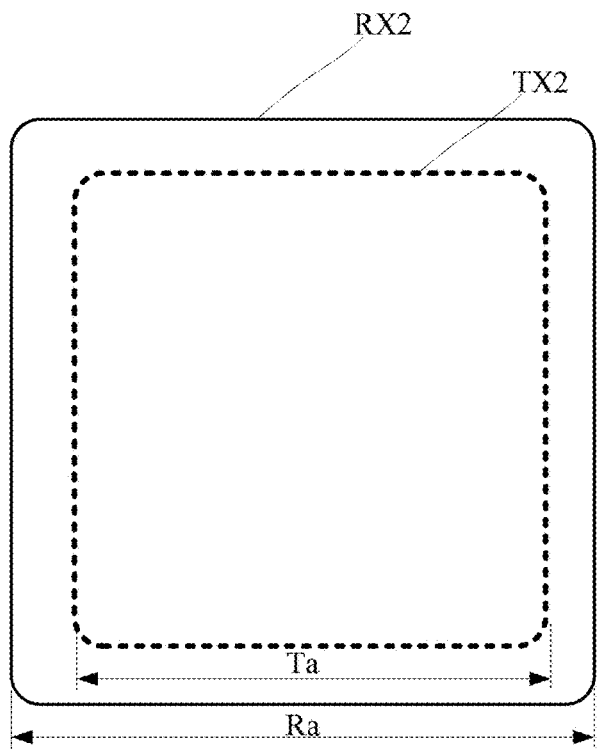
FIG. 10A shows a schematic diagram of a field-of-view relationship of another light emitter and receiver module in the prior art.
Figure 10B:
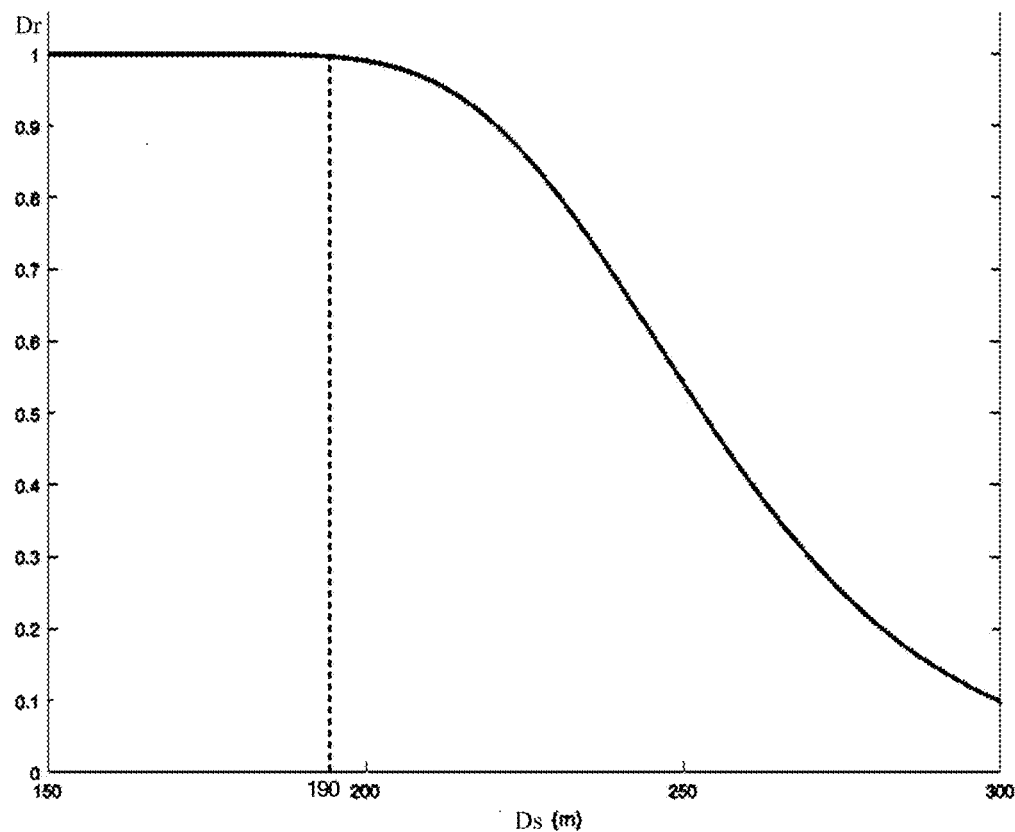
FIG. 10B shows a schematic diagram of simulation of a detection rate of another light emitter and receiver module that satisfies the field-of-view relationship shown in FIG. 10A.

In the other light emitter and receiver module, the fields of view of both the light emitter module and the light receiver module are square, and the size of the field of view of the light emitter module is smaller than the size of the field of view of the light receiver module. FIG. 10A shows a schematic diagram of a field-of-view relationship of a light emitter and receiver module. A field of view TX2 of a light emitter module and a field of view RX2 of a light receiver module are both rounded squares. A side length Ta of the field of view TX2 of the light emitter module is smaller than a side length Ra of the field of view RX2 of the light receiver module, that is, Ta<Ra. FIG. 10B shows a schematic diagram of simulation of light alignment efficiency of a light emitter and receiver module that satisfies the field-of-view relationship shown in FIG. 10A. It can be obviously seen that within a range where a detection distance Ds is approximately less than 190 m, the detection rate Dr basically remains at 1. After the detection distance Ds is greater than 190 m, the detection rate Dr begins to rapidly decrease.

It can be seen from the above simulation and comparison test that using the light emitter and receiver module in the embodiments of this disclosure can improve the light alignment accuracy.

Figure 11:
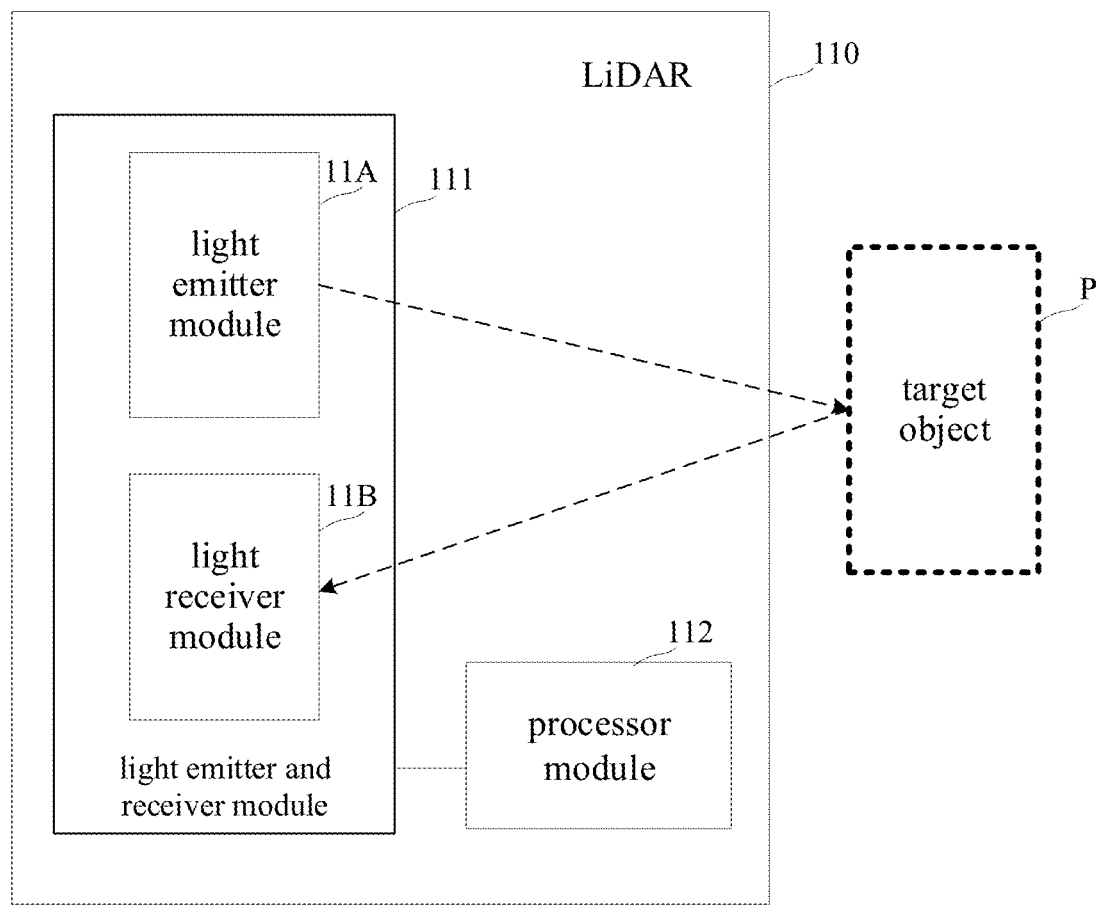
FIG. 11 shows a schematic structural diagram of a LiDAR, provided in embodiments of this disclosure.

In some embodiments, the light emitter and receiver module can be applied to various devices. As a specific application, the light emitter and receiver module can be applied to a LiDAR. Referring to a schematic structural diagram of a LiDAR shown in FIG. 11, the LiDAR 110 can include: a light emitter and receiver module 111 and a processor module 112.

The light emitter and receiver module 111 is configured to emit a detection beam, receive an echo beam reflected by a target object (e.g., target object P), and convert the echo beam into an electrical signal; and the processor module 112 is configured to control the light emitter and receiver module to emit the detection beam, and determine target object measurement information based on the detection beam and the electrical signal corresponding to the echo beam.

In embodiments of this disclosure, the light emitter and receiver module 111 can include: a light emitter module 11A and a light receiver module 11B.

The light emitter module 11A is configured to emit a detection beam; and the light receiver module 11B is configured to receive an echo beam of the detection beam reflected by a target object (e.g., target object P) and convert the echo beam into an electrical signal.

Furthermore, a field of view of the light emitter module 11A overlaps vertically with a field of view of the light receiver module 11B. In a first direction, a size of the field of view of the light emitter module 11A is larger than a size of the field of view of the light receiver module, and in a second direction, a size of the field of view of the light emitter module is smaller than a size of the field of view of the light receiver module 11B; and the first direction is perpendicular to the second direction.

The light emitter and receiver module 111 can be specifically implemented using the light emitter and receiver module in the aforementioned embodiments of this disclosure to ensure the consistency and stability of the distance measurement capabilities of various emitting and receiving channels. For specific embodiments of the light emitter and receiver module, refer to the various specific embodiments of the light emitter and receiver module, and no detailed explanation is made here.

In some embodiments, the processor module 112 can be independently implemented by any one of devices such as a single-chip microcomputer, a central processing unit, a programmable logic controller, and a field-programmable gate array ("FPGA"), or can be implemented through a combination of various devices.

Although the embodiments of this disclosure are disclosed above, this disclosure is not limited to this. Any person skilled in the art can make various alterations and modifications without departing from the spirit and scope of this disclosure. Therefore, the protection scope of this disclosure should be subject to the scope defined by the claims.

The invention claimed is:

1. A light emitter and receiver module, comprising:
   a light emitter module configured to emit a detection beam; and
   a light receiver module configured to receive an echo beam of the detection beam reflected by a target object, wherein:
   the light receiver module is configured to convert the echo beam into an electrical signal; and
   a field of view of the light emitter module configured to overlap vertically with a field of view of the light receiver module; and
   wherein:
   in a first direction, a size of the field of view of the light emitter module is larger than a size of the field of view of the light receiver module; and
   in a second direction perpendicular to the first direction, a size of the field of view of the light emitter module is smaller than a size of the field of view of the light receiver module;
   wherein the light emitter module comprises:
   a plurality of light emitter units, each comprising a plurality of light emitter points;

the plurality of light emitter units share a common cathode or a common anode; and each light emitter unit has a connection point which is electrically connected to unshared anode or cathode of the corresponding light emitter unit; and wherein the light receiver module comprises:

a plurality of detector units, each comprising a detecting region and a connection point; and at least one detector unit and one light emitter unit form a detection channel.

2. The light emitter and receiver module of claim 1, wherein the light emitter unit comprises two light emitting regions; each light emitting region comprises at least one of the light emitter points; the two light emitting regions share a cathode; and each light emitting region has a connection point.

3. The light emitter and receiver module of claim 1, wherein the plurality of light emitter units of the light emitter module are arranged in multiple columns in a vertical direction, and the multiple columns of light emitter units are staggered from each other, to cause the detection beams emitted by the various light emitter units to be staggered from each other in the vertical direction; and wherein the plurality of detector units of the light receiver module are arranged in a plurality of columns in the vertical direction, the plurality of columns of detector units are staggered from each other, and the field of view of each detector unit overlaps with the field of view of the emitter unit corresponding to the detector unit.

4. The light emitter and receiver module of claim 3, wherein the light emitter units are independently packaged lasers, and each light emitting region has an individual substrate.

5. The light emitter and receiver module of claim 3, wherein at least some of the plurality of light emitter units of the light emitter module are integrated and packaged into a single light emitter; and wherein the light emitter module further comprises:

a driver comprising a plurality of driver units; and each driver unit is configured to drive the corresponding light emitter unit in the light emitter to emit the detection beam.

6. The light emitter and receiver module of claim 5, wherein the connection points and the light emitting regions of the various light emitter units of the light emitter are arranged in columns, respectively.

7. The light emitter and receiver module of claim 6, wherein the light emitter comprises:

a plurality of columns of staggered light emitting regions; and connection points that are arranged in a single column and correspond to the various light emitting regions, and the connection points arranged in the single column are arranged in a side region of the light emitter;

the driver is arranged on one side close to the connection points of the light emitter units of the light emitter, and connection points of the various driver units are electrically connected to the connection points of the corresponding light emitter units, respectively.

8. The light emitter and receiver module of claim 7, wherein the light emitter module comprises a plurality of light emitters and a plurality of drivers, the plurality of light emitters are arranged in a plurality of columns in the vertical direction, and the multiple columns of light emitters are staggered from each other; and wherein the plurality of drivers are arranged on one sides of the corresponding light emitters close to the connection points of the light emitter units, respectively.

9. The light emitter and receiver module of claim 8, wherein the light emitter module comprises two columns of light emitters arranged in a centrosymmetric manner; and the connection points of the light emitter units of each light emitter are located in an outer side region of a light emitting region formed by the light emitting regions of the light emitter units in the two columns of light emitters.

10. The light emitter and receiver module of claim 5, wherein the light emitter comprises two columns of light emitter units arranged in the vertical direction; the two columns of light emitter units are staggered from each other, and a light emitting region formed by the light emitting regions of the two columns of light emitter units is located in a middle region of the light emitter; and the connection points are arranged in a side region of the light emitter, respectively.

11. The light emitter and receiver module of claim 10, wherein each light emitter corresponds to two drivers which are arranged on one side of the corresponding light emitter close to the connection points of the corresponding column of light emitter units, respectively.

12. The light emitter and receiver module of claim 11, wherein the light emitter module comprises a plurality of light emitters and a plurality of drivers, wherein the plurality of light emitters are arranged in multiple columns in the vertical direction, and the multiple columns of light emitters are staggered from each other; and wherein the plurality of drivers are arranged on one sides of the connection points of the corresponding columns of light emitter units of the corresponding light emitters, respectively.

13. The light emitter and receiver module of claim 5, wherein at least some of the plurality of detector units of the light receiver module are integrated and packaged into a single light detector.

14. The light emitter and receiver module of claim 13, wherein the plurality of detector units of the light detector are arranged in multiple columns in the vertical direction, and the multiple columns of detector units are staggered from each other, to cause main axes of the fields of view of the detector units to be offset from each other.

15. The light emitter and receiver module of claim 14, wherein the light detector comprises two columns of detector units, and wherein each detector unit comprises a detecting region and two connection points corresponding to the detecting region; the detecting regions of the light detector are arranged in two columns and located in a middle region of the light detector in a staggered manner; and the connection points corresponding to the detecting regions are arranged in a side region of the light detector.

16. The light emitter and receiver module of claim 15, wherein the light receiver module comprises multiple columns of light detectors, and the multiple columns of detectors are arranged in a staggered manner and correspond to positions of the corresponding light emitters.

17. The light emitter and receiver module of claim 13, wherein the light emitter comprises a vertical cavity surface emitting laser, and the light detector comprises a silicon photomultiplier.

18. A LiDAR, comprising:
a light emitter and receiver module configured to emit a detection beam, receive an echo beam reflected by a target object, and convert the echo beam into an electrical signal; and
a processor, configured to control the light emitter and receiver module to emit the detection beam, and determine target object measurement information based on the detection beam and the electrical signal corresponding to the echo beam,
wherein the light emitter and receiver module comprises:
  a light emitter module configured to emit the detection beam and a light receiver module configured to receive the echo beam of the detection beam reflected by a target object and convert the echo beam into an electrical signal; and
  a field of view of the light emitter module configured to overlap vertically with a field of view of the light receiver module, and
wherein in a first direction, a size of the field of view of the light emitter module is larger than a size of the field of view of the light receiver module, and in a second direction perpendicular to the first direction, a size of the field of view of the light emitter module is smaller than a size of the field of view of the light receiver module;
wherein the light emitter module comprises:
  a plurality of light emitter units, each comprising a plurality of light emitter points;
  the plurality of light emitter units share a common cathode or a common anode; and
  each light emitter unit has a connection point which is electrically connected to unshared anode or cathode of the corresponding light emitter unit; and
wherein the light receiver module comprises:
  a plurality of detector units, each comprising a detecting region and a connection point; and
  at least one detector unit and one light emitter unit form a detection channel.

* * * * *